United States Patent
Liu et al.

(10) Patent No.: US 10,502,559 B2
(45) Date of Patent: Dec. 10, 2019

(54) METHOD AND APPARATUS FOR MEASURING ERRORS OF MOVABLE PLATFORM IN MULTIPLE DEGREES OF FREEDOM

(71) Applicant: NATIONAL CHUNG CHENG UNIVERSITY, Chiayi County (TW)

(72) Inventors: Chien-Sheng Liu, Chiayi County (TW); Yu-Ta Chen, Chiayi County (TW); Yu-Fan Pu, Chiayi County (TW); Yong-Tai Luo, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 215 days.

(21) Appl. No.: 15/468,498

(22) Filed: Mar. 24, 2017

(65) Prior Publication Data
US 2018/0180410 A1 Jun. 28, 2018

(30) Foreign Application Priority Data
Dec. 22, 2016 (TW) .............................. 105142828 A

(51) Int. Cl.
*G01B 11/27* (2006.01)
*G01B 9/02* (2006.01)

(52) U.S. Cl.
CPC .............. *G01B 11/272* (2013.01); *G01B 9/02* (2013.01)

(58) Field of Classification Search
CPC ................................ G01B 11/272; G01B 9/02
USPC ........................................................ 250/559.3
See application file for complete search history.

(56) References Cited

U.S. PATENT DOCUMENTS

| 5,243,195 A * | 9/1993 | Nishi .................... G03F 9/7088 250/548 |
| 6,563,594 B2 * | 5/2003 | Mikami .............. G03F 7/70633 250/559.3 |
| 2012/0276813 A1 * | 11/2012 | Stocker .................. B23Q 1/015 451/1 |
| 2016/0370170 A1 * | 12/2016 | Chen ...................... G01B 11/00 |

* cited by examiner

*Primary Examiner* — Seung C Sohn
(74) *Attorney, Agent, or Firm* — Rosenberg, Klein & Lee

(57) ABSTRACT

The present invention relates to a method and an apparatus for measuring errors of a movable platform in multiple degrees of freedom. A light-source module disposed on a fixed platform emits light to a lens module disposed on a movable platform. The light is reflected to one or more optoelectronic sensing module on the fixed platform via the lenses of the lens module. Then a processing unit calculates an alignment error or/and one or more straightness error or/and one or more angle error of the movable platform according to the signal generated by the optoelectronic sensing module.

29 Claims, 15 Drawing Sheets

METHOD AND APPARATUS FOR MEASURING ERRORS OF MOVABLE PLATFORM IN MULTIPLE DEGREES OF FREEDOM

FIELD OF THE INVENTION

The present invention relates to a measurement system, and particularly to a method and an apparatus for measuring errors of a movable platform in multiple degrees of freedom by calculating the errors of the movable platform according to the signal of the light emitted from a light-source module and reflected to an optoelectronic sensing module by a mirror set disposed on the movable platform.

BACKGROUND OF THE INVENTION

As technologies progress, the technical level and products in the mechanical manufacturing industry are upgraded continuously. The competition among mechanical manufacturer worldwide becomes harsh. Consequently, to maintain competitiveness and exploring new and developing markets, in addition to uninterrupted development of new products and technologies for increasing revenues, during the manufacturing process, mechanical manufacturers should also improve the accuracy, production yield, and efficiency of products.

To improve the accuracy, production yield, and efficiency of products, in addition to developing machine tools that manufacture products, during the manufacturing process of machine tools, the measurement techniques for errors of the machine tools must follow the progress of the machine tools, so that high-precision machine tools can have high-precision measurement techniques for inspecting or compensating their error in the ex-factory calibration stage. Thereby, the production yield and efficiency of products can be enhanced.

Currently, the optical equipment is applied to measuring errors of machine tools. The representative equipment is the laser interferometer. While measuring errors using a laser interferometer, a laser beam is divided into two and reflected by corresponding mirrors. During the reflection process, the two laser beams interfere with each other. By analyzing the acquired interference graph, the errors of a platform can be calculated. Unfortunately, most laser interferometers can measure only one error at a time. Thereby, to measure multiple errors, it is unavoidable to perform multiple measurements. In the process, undoubtedly, much time will be wasted and the speed for ex-factory calibration will be decreased drastically. Moreover, laser interferometers are costly. If one machine tool should include a laser interferometer for measuring errors, the cost of products will be increased.

SUMMARY

An objective of the present invention is to provide a method and an apparatus for measuring errors of a movable platform in multiple degrees of freedom. A light-source module disposed on a fixed platform emits light to a lens module disposed on a movable platform. The light is reflected from the lens module to one or more optoelectronic sensing module disposed on the fixed platform. A processing unit then calculates the alignment error or/and straightness error or/and angle error of the movable platform according to the signal generated by the optoelectronic sensing module upon receiving the light.

In order to achieve the above objective and efficacy, according to an embodiment of the present invention, a method for measuring errors of a movable platform in multiple degrees of freedom is disclosed. The method comprises steps of: a light-source module emitting light to a lens module disposed on a movable platform; the light reflected to one or more optoelectronic sensing module via the lens module; and a processing unit calculating an alignment error or/and one or more straightness error or/and one or more angle error of the movable platform according to the signal generated by the optoelectronic sensing module upon receiving the light.

According to an embodiment of the present invention, when the one or more optoelectronic sensing module includes a first optoelectronic sensing module, the processing unit calculates to give the Y-axis alignment error of the movable platform according to the centroid coordinates of a first light spot generated by the light on the first optoelectronic sensing module.

According to an embodiment of the present invention, when the one or more optoelectronic sensing module includes a second optoelectronic sensing module, the processing unit calculates to give the X-axis straightness error or/and Z-axis straightness error of the movable platform according to the centroid coordinates of a second light spot generated by the light on the second optoelectronic sensing module.

According to an embodiment of the present invention, when the one or more optoelectronic sensing module includes a third optoelectronic sensing module and a fourth optoelectronic sensing module, the processing unit calculates to give the X-axis angle error or/and the Y-axis angle error or/and the Z-axis angle error of the movable platform according to the signals generated by the third optoelectronic sensing module and the fourth optoelectronic sensing module upon receiving the light.

According to an embodiment of the present invention, when the lens module includes a first vertical reflecting lens or a first vertical reflecting lens set, after the light enters the first vertical reflecting lens or the first vertical reflecting lens set, the light is reflected in the first vertical reflecting lens or the first vertical reflecting lens set for two or more times and then emitted vertically to the fourth optoelectronic sensing module.

According to an embodiment of the present invention, when the lens module includes a second vertical reflecting lens or a second vertical reflecting lens set, after the light enters the second vertical reflecting lens or the second vertical reflecting lens set, the light is reflected in the second vertical reflecting lens or the second vertical reflecting lens set for two or more times and then emitted vertically to the third optoelectronic sensing module.

In addition, according to another embodiment of the present invention, an apparatus for measuring errors of a movable platform in multiple degrees of freedom is disclosed. The apparatus comprises a fixed platform and a movable platform. The fixed platform includes a light-source module and one or more optoelectronic sensing module. The movable platform includes a lens module and a processing unit. The light-source module emits light to the lens module. The processing unit is connected electrically with the one or more optoelectronic sensing module.

According to an embodiment of the present invention, the lens module includes a first spectroscope disposed on the movable platform and corresponding to the light-source module. The light-source module emits light to the first spectroscope. The first spectroscope forms a first split beam and a second split beam.

According to an embodiment of the present invention, the lens module includes a second spectroscope disposed on one side of the first spectroscope. The first split beam emits to the second spectroscope. The second spectroscope forms a third split beam and a fourth split beam.

According to an embodiment of the present invention, the lens module includes a polarizing spectroscope disposed on one side of the second spectroscope. The third split beam emits to the polarizing spectroscope. The polarizing spectroscope forms a fifth split beam and a sixth split beam.

According to an embodiment of the present invention, the lens module includes a first reflecting lens disposed on one side of the polarizing spectroscope and reflecting the fifth split beam.

According to an embodiment of the present invention, the lens module includes a first lens disposed on one side of the first reflecting lens. The fifth split beam passes through the first lens. After the fifth split beam passes through the first lens, it projects to the first optoelectronic sensing module of the one or more optoelectronic module.

The processing unit calculates to give the Y-axis alignment error of the movable platform according to the centroid coordinates of a first light spot projected by the fifth split beam on the first optoelectronic sensing module.

According to an embodiment of the present invention, the lens module includes a quarter wavelength plate and a corner cube prism. The quarter wavelength plate is disposed on one side of the polarizing spectroscope. The corner cube prism is disposed on one side of the quarter wavelength plate. The sixth split beam passes through the quarter wavelength plate an emits to the corner cube prism. The corner cube prism reflects the light from the sixth split beam and the polarizing spectroscope to a second optoelectronic sensing module of the one or more optoelectronic sensing module. The processing unit calculates to give the X-axis straightness error or/and the Z-axis straightness error of the movable platform according to the centroid coordinates of a second light spot projected by the sixth split beam on the second optoelectronic sensing module.

According to an embodiment of the present invention, the lens module includes a second reflecting lens, a first vertical reflecting lens or a first vertical reflecting lens set, and a second vertical lens or a second vertical reflecting lens set. The second reflecting lens is disposed on one side of the second spectroscope. The first vertical reflecting lens or the first vertical reflecting lens set is disposed on one side of the second reflecting lens. The second vertical reflecting lens or the second vertical reflecting lens set is disposed on one side of the first spectroscope. The second reflecting lens reflects the fourth split beam to the first vertical reflecting lens or the first vertical reflecting lens set. The light is reflected in the first vertical reflecting lens or the first vertical reflecting lens set two or more times and then emitted vertically to a fourth optoelectronic sensing module of the one or more optoelectronic sensing module. The second split beam is reflected in the second vertical reflecting lens or the second vertical reflecting lens set for two or more times and then emitted vertically to a third optoelectronic sensing module. The processing unit calculates to give the X-axis angle error or/and the Y-axis angle error or/and the Z-axis angle error of the movable platform according to the signal generated by the third optoelectronic sensing module upon receiving the second split beam and the signal generated by the fourth optoelectronic sensing module upon receiving the second split beam.

DETAILED DESCRIPTION

In order to make the structure and characteristics as well as the effectiveness of the present invention to be further understood and recognized, the detailed description of the present invention is provided as follows along with embodiments and accompanying figures.

According to the prior art, measuring errors using a laser interferometer will slow down the speed of ex-factory calibration and increase manufacturing cost. Thereby, the present invention provides a method and an apparatus for measuring errors of a movable platform in multiple degrees of freedom by using a non-interference way and the trigonometric ranging or/and geometric optics principles.

Figure 1:
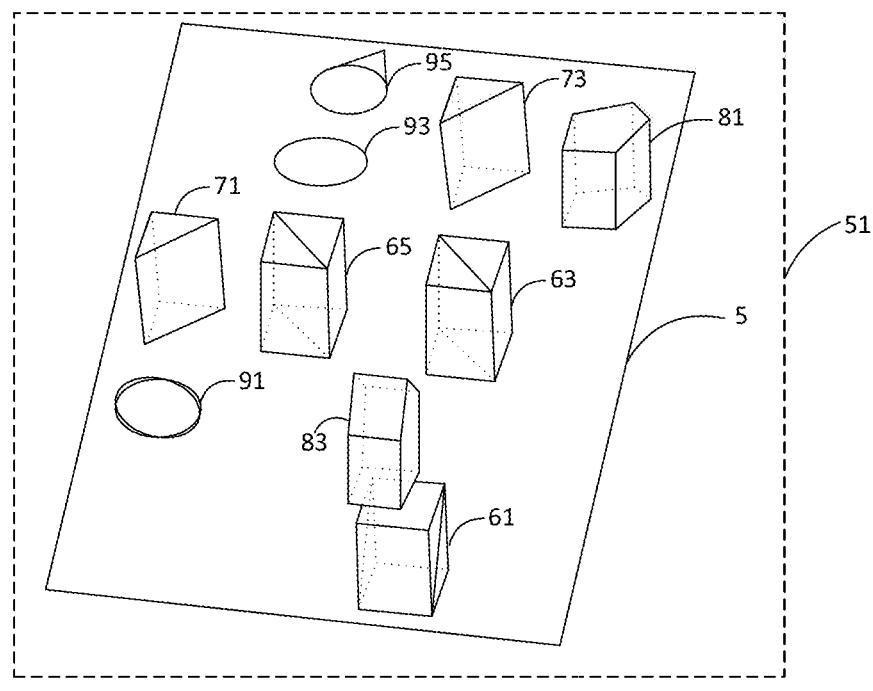
FIG. 1 shows a block diagram of the method and apparatus for measuring errors of a movable platform in multiple degrees of freedom according to the first embodiment of the present invention.
Figure 1:
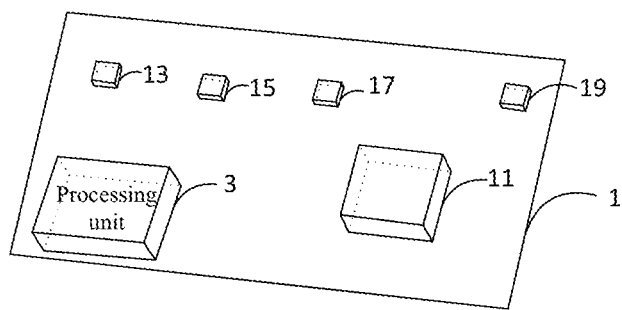
Figure 1:
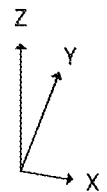

Here, the method for measuring errors of a movable platform in multiple degrees of freedom according to the first embodiment of the present invention will be described. Please refer to FIG. 1, which shows a block diagram of the method and apparatus for measuring errors of a movable platform in multiple degrees of freedom according to the first embodiment of the present invention. As shown in the figure, the apparatus for executing the method for measuring errors of a movable platform in multiple degrees of freedom according to the present embodiment comprises a fixed platform 1 and a movable platform 5. The movable platform 5 can be moved by linear motors, step motors, and guideways.

The fixed platform 1 includes a light-source module 11, a first optoelectronic sensing module 13, a second optoelectronic sensing module 15, a third optoelectronic sensing module 17, a fourth optoelectronic sensing module 19, and a processing unit 3.

The light-source module 11 described above can devices capable of emitting light, such as lasers, mercury lamps, fluorescent lamps, halogen lamps, and LEDs.

The first optoelectronic sensing module 13, the second optoelectronic sensing module 15, the third optoelectronic sensing module 17, and the fourth optoelectronic sensing module 19 can be charge-coupled devices (CCD), contact image sensors (CIS), complementary metal-oxide-semiconductor (CMOS) sensors, or any other electronic devices capable of converting optical images to electronic signals.

The processing unit 3 described above is an electronic device capable of performing arithmetic and logic operations. The processing unit 3 is connected with the first optoelectronic sensing module 13, the second optoelectronic sensing module 15, the third optoelectronic sensing module 17, and the fourth optoelectronic sensing module 19 in wired or wireless methods. In other words, the processing unit 3 acquires data generated by the first optoelectronic sensing module 13, the second optoelectronic sensing module 15, the third optoelectronic sensing module 17, and the fourth optoelectronic sensing module 19 in wired or wireless methods.

A lens module 51 is disposed on the movable platform 5 and includes a first spectroscope 61, a second spectroscope 63, a polarizing spectroscope 65, a first reflecting lens 71, a second reflecting lens 73, a first vertical reflecting lens 81, a second vertical reflecting lens 83, a first lens 91, a quarter wavelength plate 93, and a corner cube prism 95 (also known as a three-facet right-angle prism). The first spectroscope 61 is disposed on the movable platform 5 and corresponding to the light-source module 11 on the fixed platform 1. That is to say, the location of the first spectroscope 61 allows the light emitted from the light-source module 11 to enter the first spectroscope 61. The second spectroscope 63 is disposed on one side of the first spectroscope 61. The polarizing spectroscope 65 is disposed on one side of the second spectroscope 63. The first reflecting lens 71 is disposed on one side of the polarizing spectroscope 65. The first lens 91 is disposed on one side of the first reflecting lens 71. The quarter wavelength plate 93 is disposed on one side of the polarizing spectroscope 65. The corner cube prism 95 is disposed on one side of the quarter wavelength plate 93. The second reflecting lens 73 is disposed on one side of the second spectroscope 63. The first vertical reflecting lens 81 is disposed on one side of the second reflecting lens 73. The second vertical reflecting lens 83 is disposed on one side of the first spectroscope 61.

The materials of the first spectroscope 61, the second spectroscope 63, the polarizing spectroscope 65, the first reflecting lens 71, the second reflecting lens 73, the first vertical reflecting lens 81, the second vertical reflecting lens 83, the first lens 91, the quarter wavelength plate 93, and the corner cube prism 95 described above can be glass, resin, plastics, crystal, polymethylmethacrylate, allyl diglycol carbonate, polycarbonate, or other materials suitable for making lenses.

Figure 2:
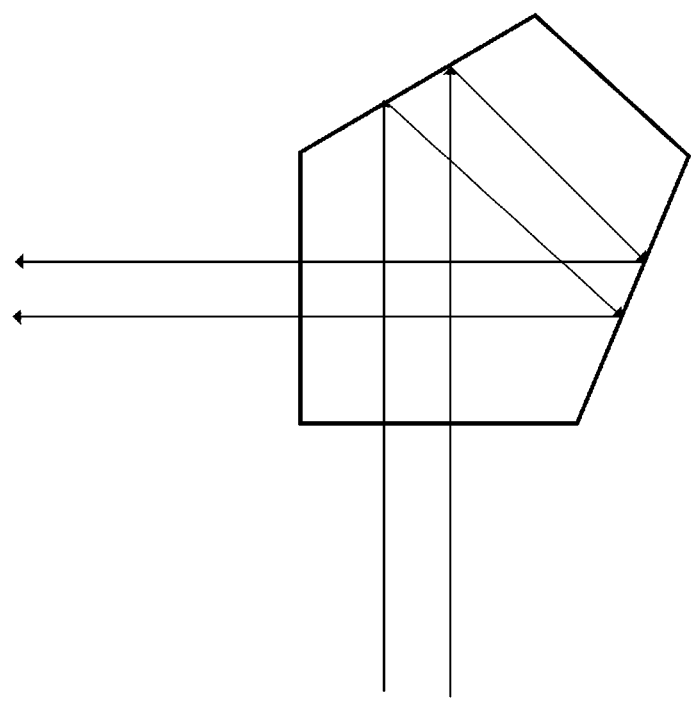
FIG. 2 shows a schematic diagram of reflections of the incident light inside a pentaprism in the method and apparatus for measuring errors of a movable platform in multiple degrees of freedom according to the first embodiment of the present invention.

The above first vertical reflecting lens 81 and the second vertical reflecting lens 83 enable the incident light to reflect two or more times in the vertical reflecting lenses before emerging vertically. In other words, the incident light is perpendicular to the emergent light. FIG. 2 shows a schematic diagram of reflections of the incident light inside a pentaprism. As shown in the figure, the incident light reflects twice inside the pentaprism and emerges vertically. Nonetheless, the first and second vertical reflecting lenses 81, 83 according to the present invention are not limited to pentaprisms. Any reflecting lens, for example, a ridge prism, having the characteristics of enabling the incident light to reflect two or more times inside the vertical reflecting lens and emerge vertically can be adopted as the first and second vertical reflecting lenses 81, 83.

Figure 3A:
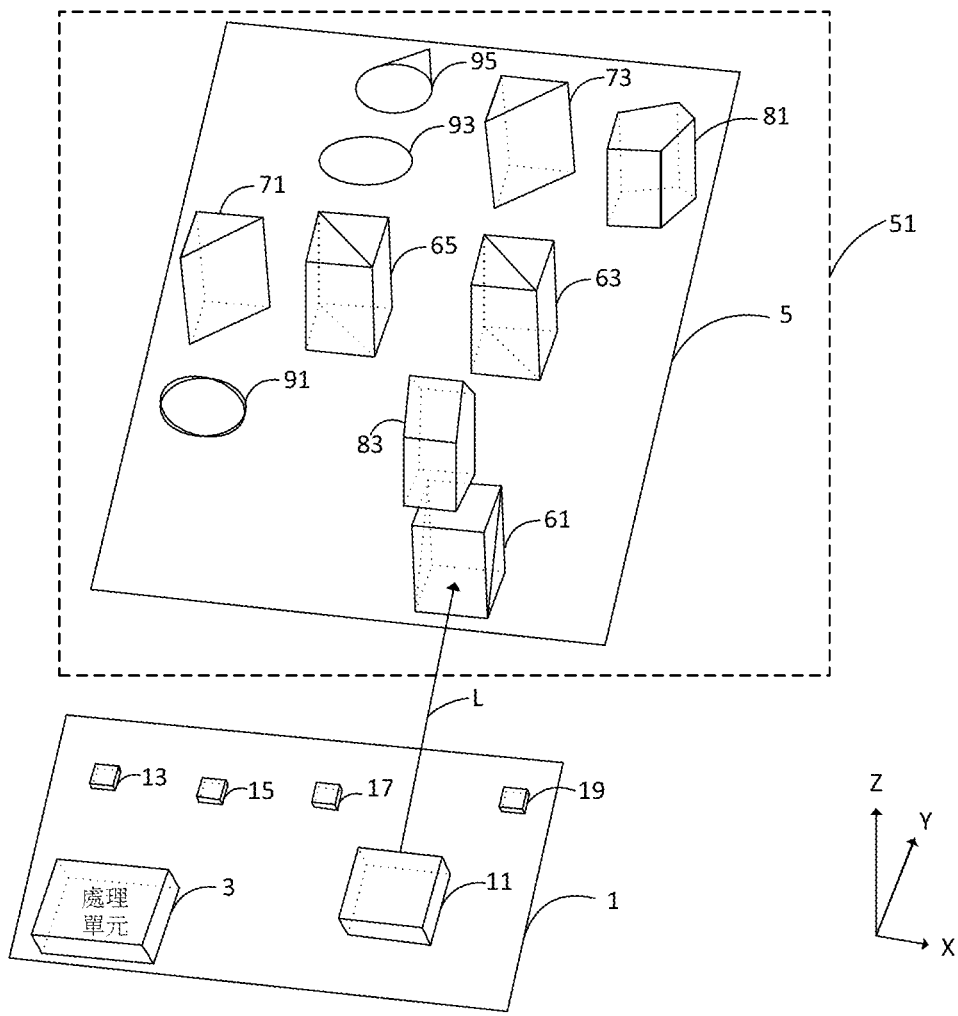
FIGS. 3A to 3F show schematic diagrams of the light paths in the method and apparatus for measuring errors of a movable platform in multiple degrees of freedom according to the first embodiment of the present invention.
Figure 3B:
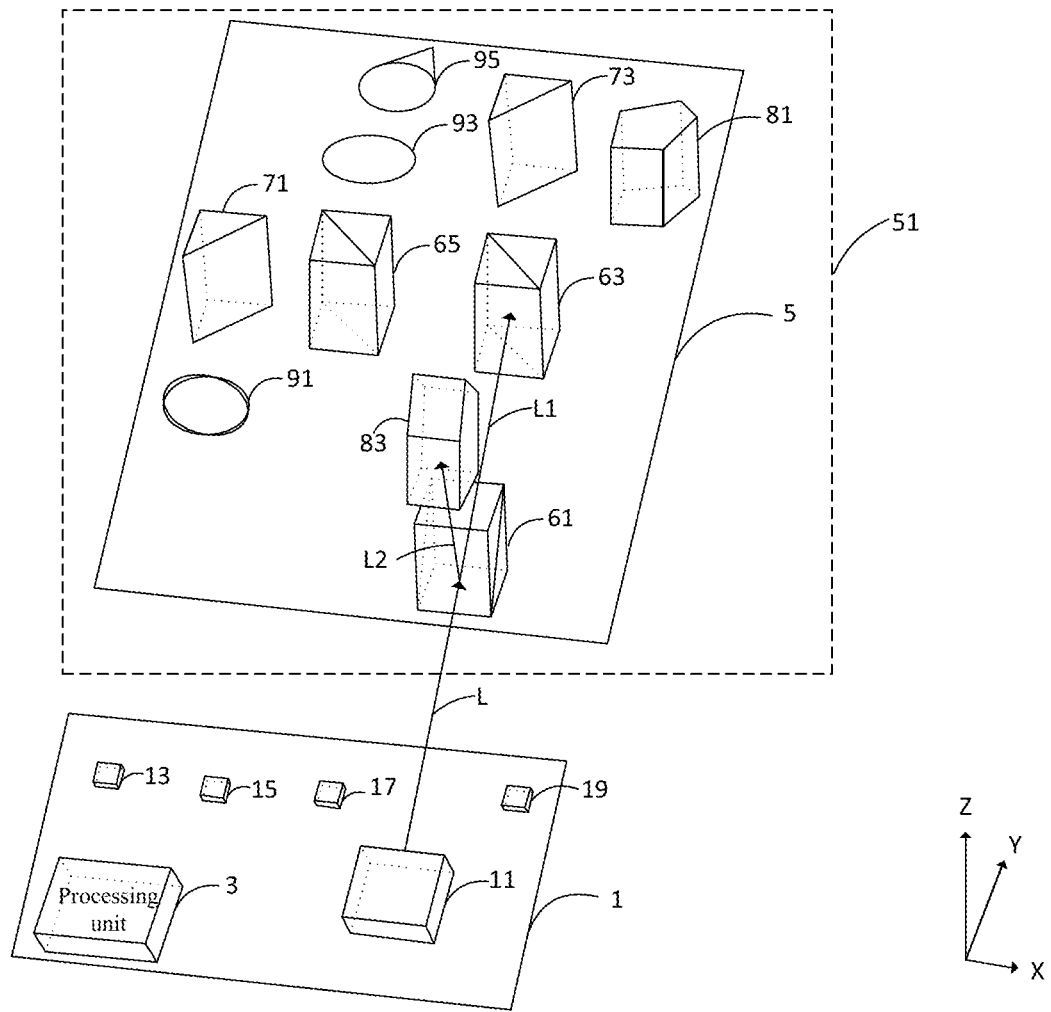
Figure 3C:
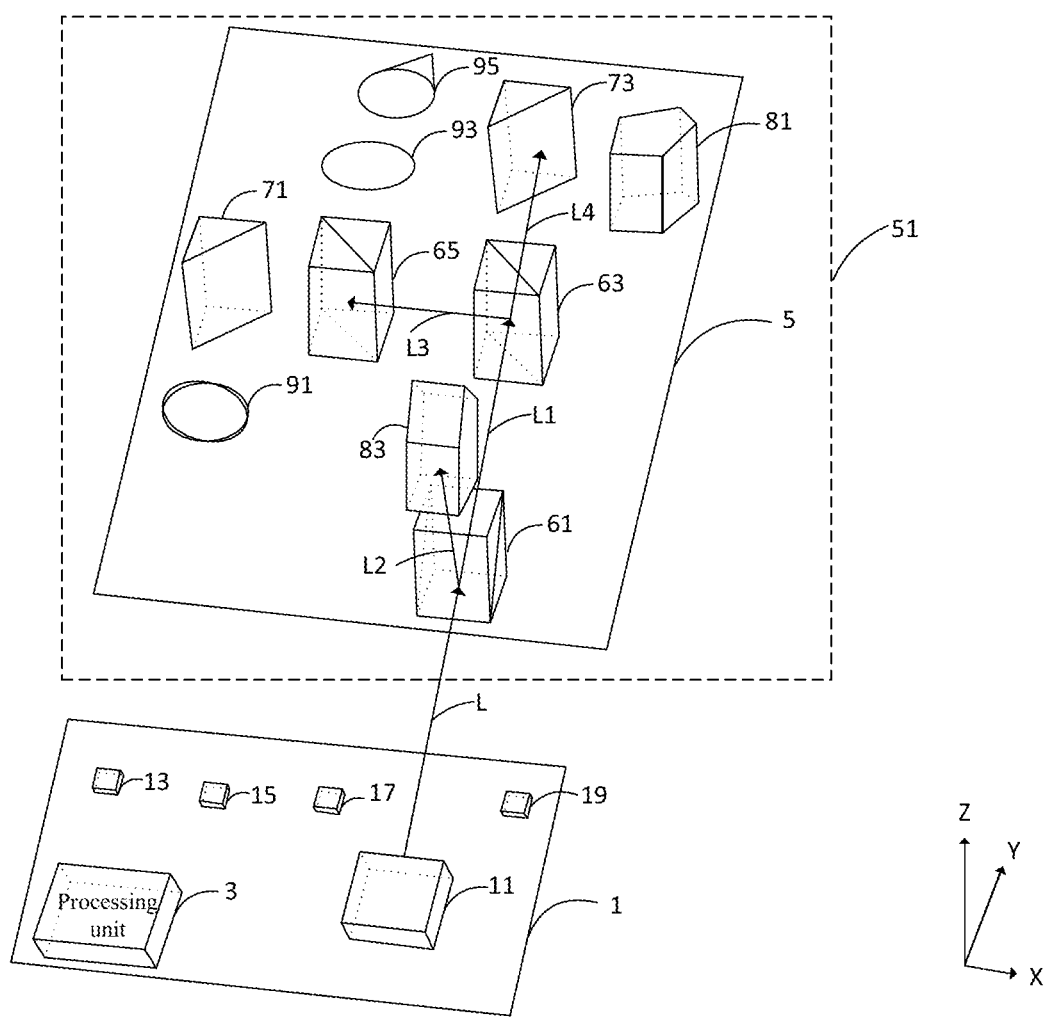
Figure 3D:
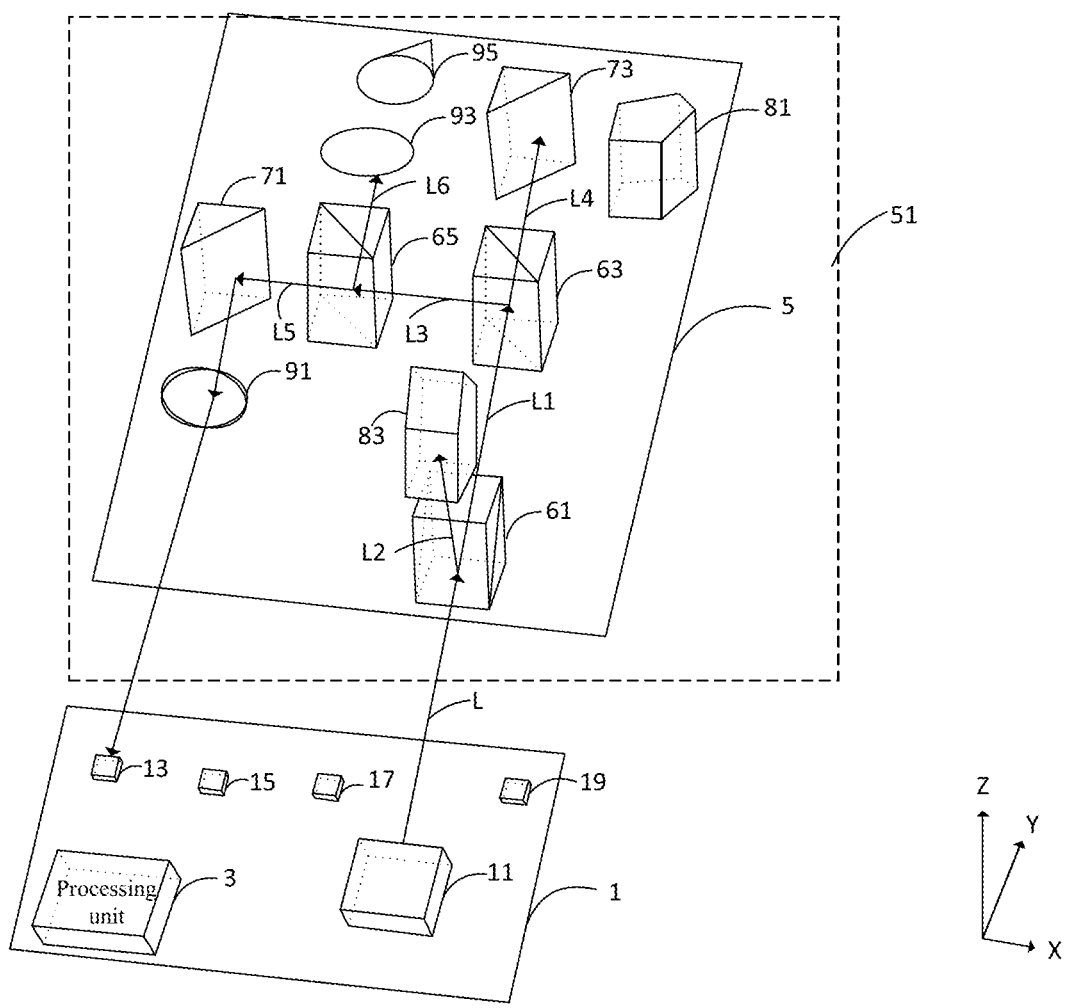

Next, the light paths in the method for measuring errors of a movable platform in multiple degrees of freedom according to the first embodiment of the present invention will be described. Please refer to FIGS. 3A to 3F, which show schematic diagrams of the light paths in the method and apparatus for measuring errors of a movable platform in multiple degrees of freedom according to the first embodiment of the present invention. While using the present invention to measure errors of a movable platform in multiple degrees of freedom, as shown in FIG. 3A, the light-source module 11 emits a beam of light L to the first spectroscope 61. As shown in FIG. 3B, after the light L is incident to the first spectroscope 61, a first split beam L1 and a second split beam L2 will be formed. As shown in FIG. 3C, after the first split beam L1 is incident to the second spectroscope 63, a third split beam L3 and a fourth split beam L4 will be formed. As shown in FIG. 3D, after the third split beam L3 is incident to the polarizing spectroscope 65, a fifth split beam L5 and a sixth split beam L6 will be formed. The fifth split beam L5 is incident to the first reflecting lens 71, which reflects the fifth split beam L5 to the first lens 91. As the fifth split beam L5 passes through first lens 91, the first lens 91 changes the traveling angle of the fifth split beam L5 and projects the fifth split beam L5 to the first optoelectronic sensing module 13 and forming a first light spot.

Figure 3E:
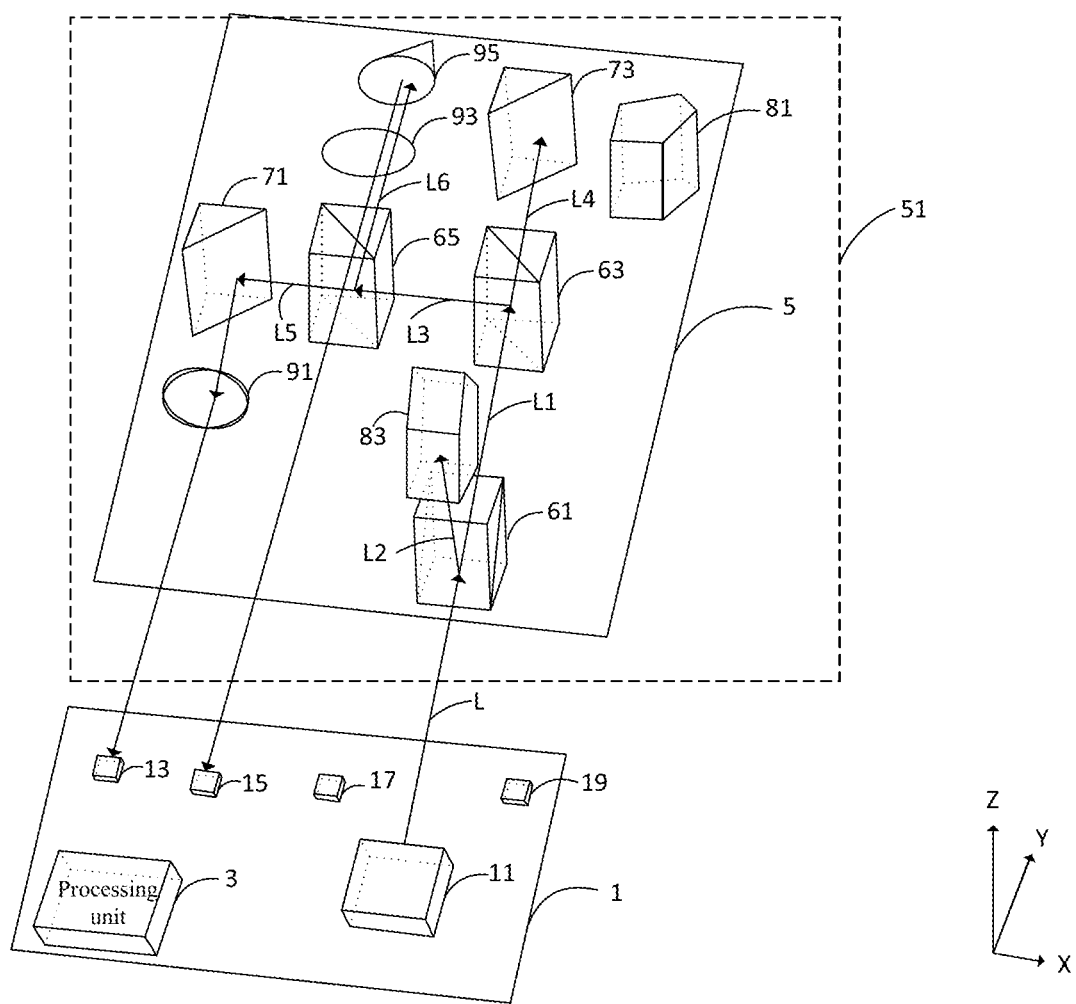

As shown in FIG. 3E, after the sixth split beam L6 passes through the quarter wavelength plate 93, the polarization direction is changed. The sixth split beam L6 is incident to the corner cube prism 95, which reflects the sixth split beam L6 and enables the sixth split beam L6 to pass through the quarter wavelength plate 93 again for changing the polarization direction again. Afterwards, it passes through the polarizing spectroscope 65 and is incident to the second optoelectronic sensing module 15 to form a second light spot.

Figure 3F:
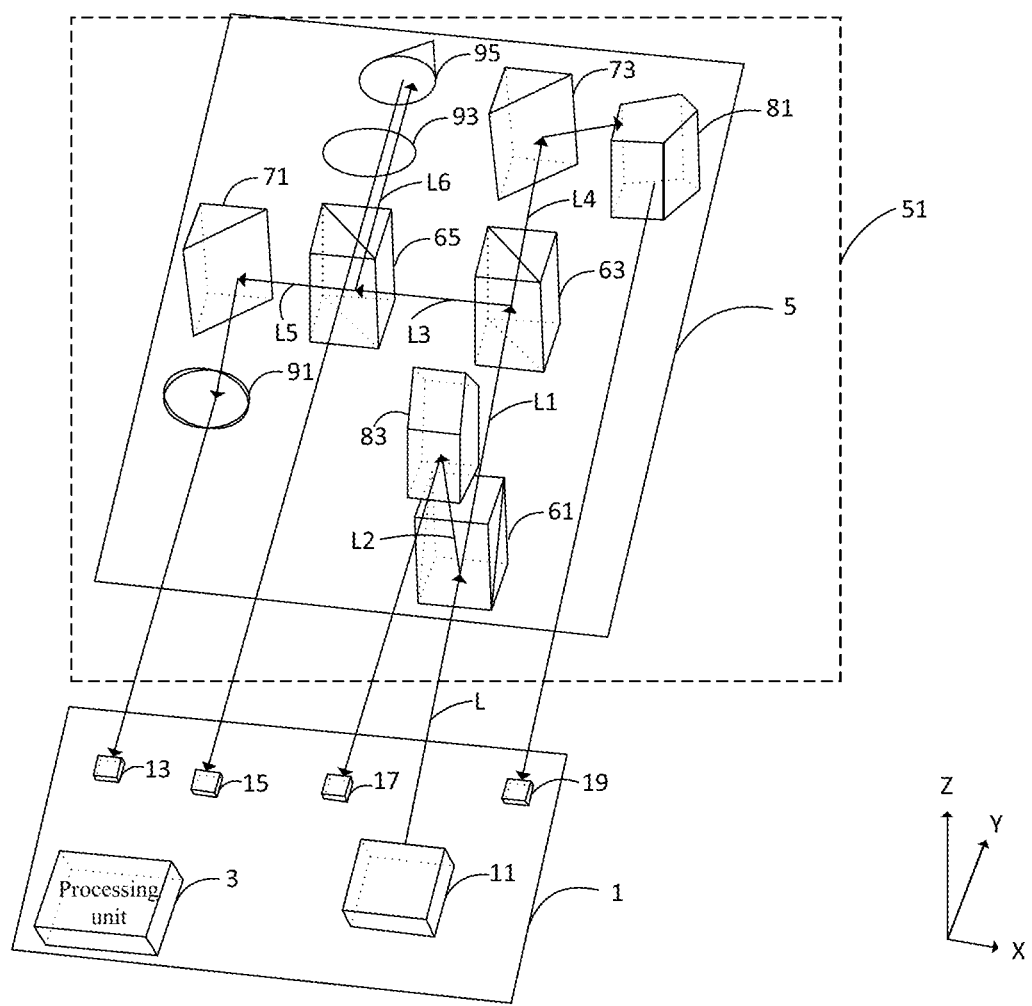

As shown in FIG. 3F, after the second split beam L2 is incident to the second vertical reflecting lens 83, it reflects inside the second vertical reflecting lens 83 and emerges vertically to the third optoelectronic sensing module 17 and forming a third light spot. After the fourth split beam L4 is incident to the second reflecting lens 73, it is reflected by the second reflecting lens 73 and incident to the first vertical reflecting lens 81. Then it is reflected inside the first vertical reflecting lens 81 and emerges vertically to the fourth optoelectronic sensing module 19.

Figure 4:
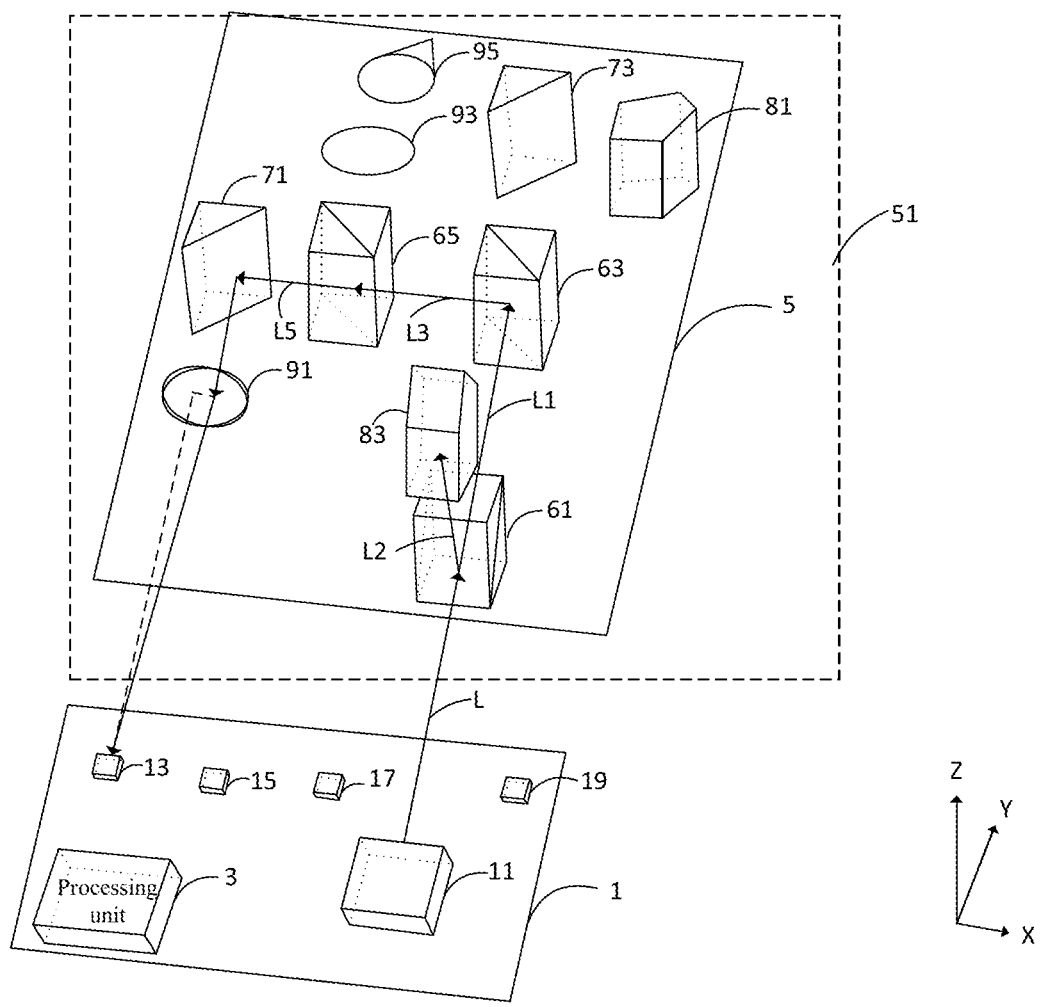
FIG. 4 shows a schematic diagram of trigonometric ranging in the method and apparatus for measuring errors of a movable platform in multiple degrees of freedom according to the first embodiment of the present invention.

As shown in FIG. 4, because the angle will be altered after the fifth split beam L5 passes through the first lens 91, the processing unit 3 can calculate and give the Y-axis alignment error of the movable platform 5 according to the centroid coordinates of the first light spot using the trigonometric ranging method.

Figure 5A:
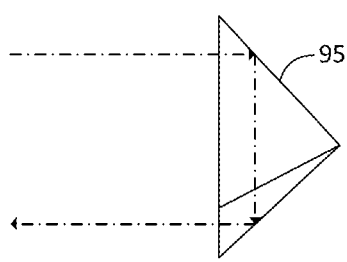
FIG. 5A shows a schematic diagram of the light path of the corner cube prism without straightness error in the method and apparatus for measuring errors of a movable platform in multiple degrees of freedom according to the first embodiment of the present invention.
Figure 5B:
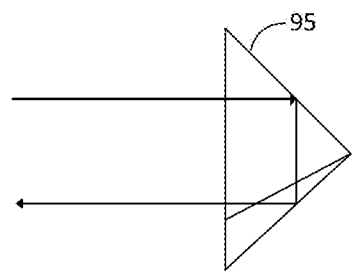
FIG. 5B shows a schematic diagram of the light path of the corner cube prism with straightness error in the method and apparatus for measuring errors of a movable platform in multiple degrees of freedom according to the first embodiment of the present invention.
Figure 5C:
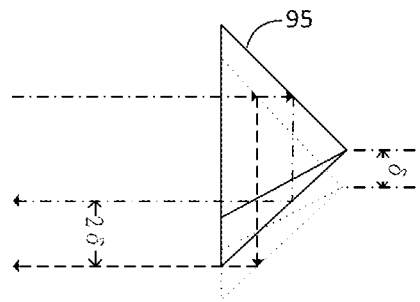
FIG. 5C shows a schematic diagram comparing the light paths of the corner cube prism with and without straightness error in the method and apparatus for measuring errors of a movable platform in multiple degrees of freedom according to the first embodiment of the present invention.

When the movable platform 5 has no straightness error, the light reflection path of the corner cube prism 95 is shown as in FIG. 5A. When the movable platform 5 has straightness error, the light reflection path of the corner cube prism 95 is shown as in FIG. 5B. As shown in FIG. 5C, by comparing the light paths with and without straightness error, it is known that the corner cube prism 95 will magnify the straightness error by two if a straightness error occurs. In FIG. 5C, the dotted lines illustrate the corner cube prism without straightness error while the solid lines illustrate one with straightness error. Because the corner cube prism 95 owns the characteristics of magnifying a straightness error by two, when the movable platform 5 has a straightness error, the sixth split beam L6 will be shifted by two times after the reflection of the corner cube prism 95 and incident to the second optoelectronic sensing module 15 for forming the second light spot. The processing unit 3 adopts the homogeneous coordinate transformation and the skew ray tracing method to calculate and give the X-axis straightness error or/and Z-axis straightness error of the movable platform 5 according to the centroid coordinates of the second light spot.

When the movable platform 5 has X-axis angle error or/and Y-axis angle error or/and Z-axis angle error, the angles of the first split beam L1 and the second split beam L2 will be changed because the lenses on the light paths are moved due to the angle errors of the movable platform 5. Thereby, the light paths of the fourth and second split beams L4, L2 will be altered. As the fourth split beam L4 I incident to the first vertical reflecting lens 81, each reflection of the fourth split beam L4 in the first vertical reflecting lens 81 will be shifted owing to the angular change of the first vertical reflecting lens 81. Because the fourth split beam L4 will reflect twice in the first vertical reflecting lens 81, the light path of the fourth split beam L4 will shift twice as well. In addition, the second split beam L2 will reflect twice in the second vertical reflecting lens 83. Hence, its light path will shift twice as well. The processing unit 3 adopts the homogeneous coordinate transformation and the skew ray tracing method to calculate and give the X-axis angle error or/and the Y-axis angle error or/and Z-axis angle error of the movable platform 5 according to the centroid coordinates of the third light spot formed by the incident second split beam L2 to the third optoelectronic sensing module 17 and the centroid coordinates of the fourth light spot formed by the incident fourth split beam L4 to the fourth optoelectronic sensing module 19.

Because the second split beam L2 and the fourth split beam L4 will experience greater changes in their light paths as a result of the two shifts caused by the vertical reflecting lenses, the shifts of the third light spot formed on the third optoelectronic sensing module 17 by the incident second split beam L2 and the fourth light spot formed on the fourth optoelectronic sensing module 19 by the incident fourth split beam L4 will be more obvious than those without using the vertical reflecting lenses. Consequently, the method according to the present invention can give higher measurement resolution, and hence less obvious X-axis angle error or/and Y-axis angle error or/and Z-axis angle error can be measured.

The centroid coordinates of the first light spot, the centroid coordinates of the second light spot, the centroid coordinates of the third light spot, and the centroid coordinates of the fourth light spot can be calculated and give by using general image processing techniques, which include binarization, morphology, image filling and removal of small areas, convex hulls. The centroid of a light spot is to multiply the weighted pixel intensity value $P_{ij}$ at the i-th row and the j-th column of an image by its location and then divide the product by the sum of the pixel intensity values of the image. The formula is shown as follows:

$$x_{centroid} = \frac{\sum \sum x P_{ij}}{\sum \sum P_{ij}}$$

$$y_{centroid} = \frac{\sum \sum y P_{ij}}{\sum \sum P_{ij}}$$

Before the processing unit 3 calculates the centroid coordinates of the light spots, the processing unit 3 can first filter out the noises in the first, second, third, and fourth optoelectronic sensing modules 13, 15, 17, 19. In addition, the processing unit 3 can also set a threshold value in advance so that the darker parts on the first, second, third, and fourth optoelectronic sensing modules 13, 15, 17, 19 can be removed for reducing interference of noises. Furthermore, the processing unit 3 can also adopts other image processing methods to calculate and give the centroids of the first, second, third, and fourth light spots. Calculations based on the centroid coordinates of the light spots can lower the errors caused by light dispersion and hence increasing the accuracy of measurement.

Figure 6A:
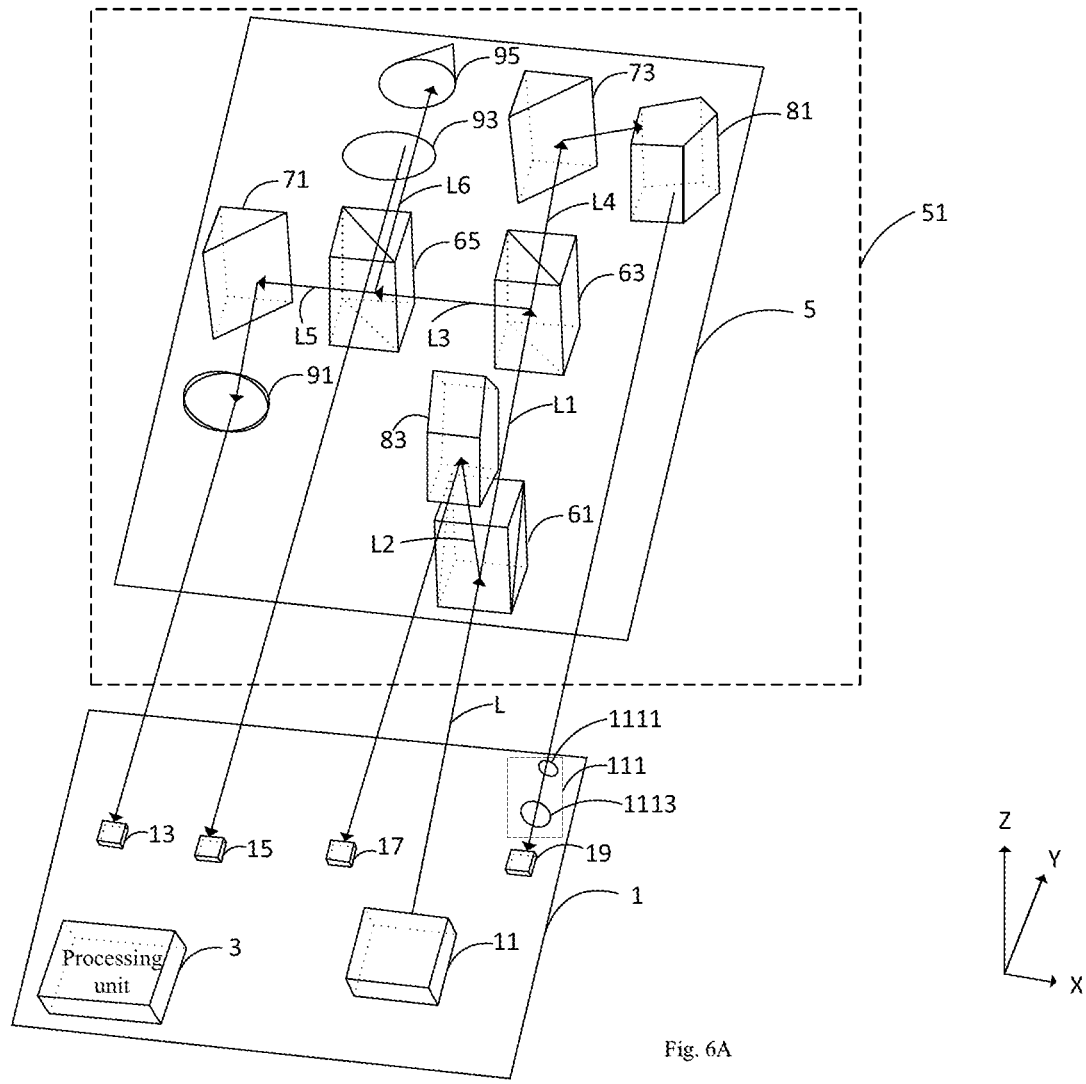
FIGS. 6A to 6D show schematic diagrams of the light paths in the method and apparatus for measuring errors of a movable platform in multiple degrees of freedom according to the second embodiment of the present invention.

In the following, the method for measuring errors of a movable platform in multiple degrees of freedom according to the second embodiment of the present invention will be described. Please refer to FIG. 6A, which shows a block diagrams of the light paths in the method and apparatus for measuring errors of a movable platform in multiple degrees of freedom according to the second embodiment of the present invention. As shown in the figure, the difference between the present embodiment and the first one is that, according to the present embodiment, a biconvex lens set 111 is further disposed on the fixed platform 1. The biconvex lens set 111 includes a first convex lens 1111 and a second convex lens 1113. The rest is the same as the first embodiment. Hence, the details will not be described again.

According to the present embodiment, the fourth split beam L4 is incident to the biconvex lens set 111 and passes through the first and second convex lenses 1111, 1113, and thus making the fourth split beam LA4 more expanded and increasing the shifts of the incident fourth split beam LA on the fourth optoelectronic sensing module 19. Thereby, the sensitivity of the fourth optoelectronic sensing module 19 on light shifts, which corresponds to errors, is improved. Consequently, the accuracy of measurement is enhanced.

Figure 6B:
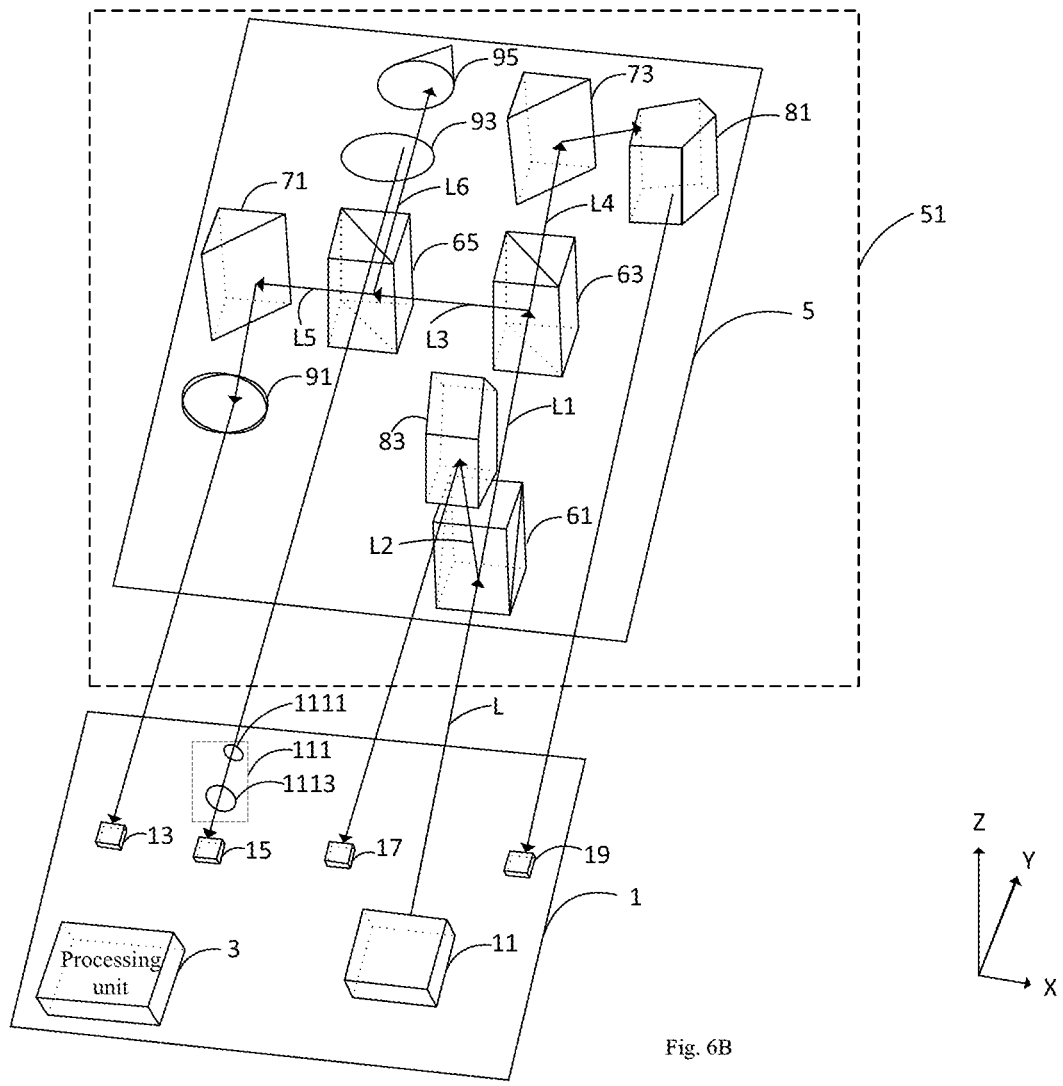
Figure 6C:
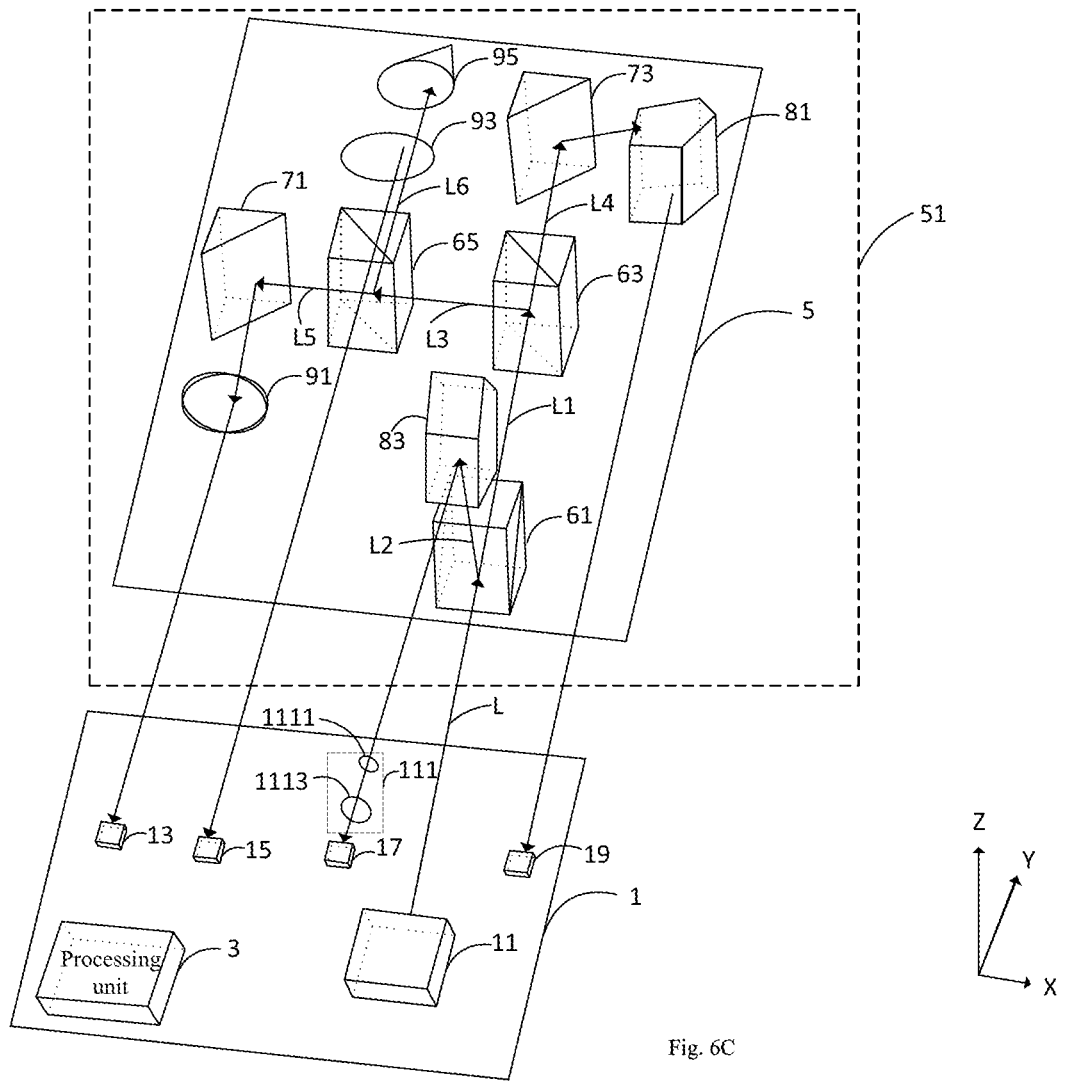

The biconvex lens set 111 according to the present embodiment is not limited to be disposed in front of the fourth optoelectronic sensing module 19. As shown in FIG. 6B, it can be further disposed in front of the second optoelectronic sensing module 15. Alternatively, as shown in FIG. 6C, the biconvex lens set 111 can be disposed in front of the third optoelectronic sensing module 17.

Figure 6D:
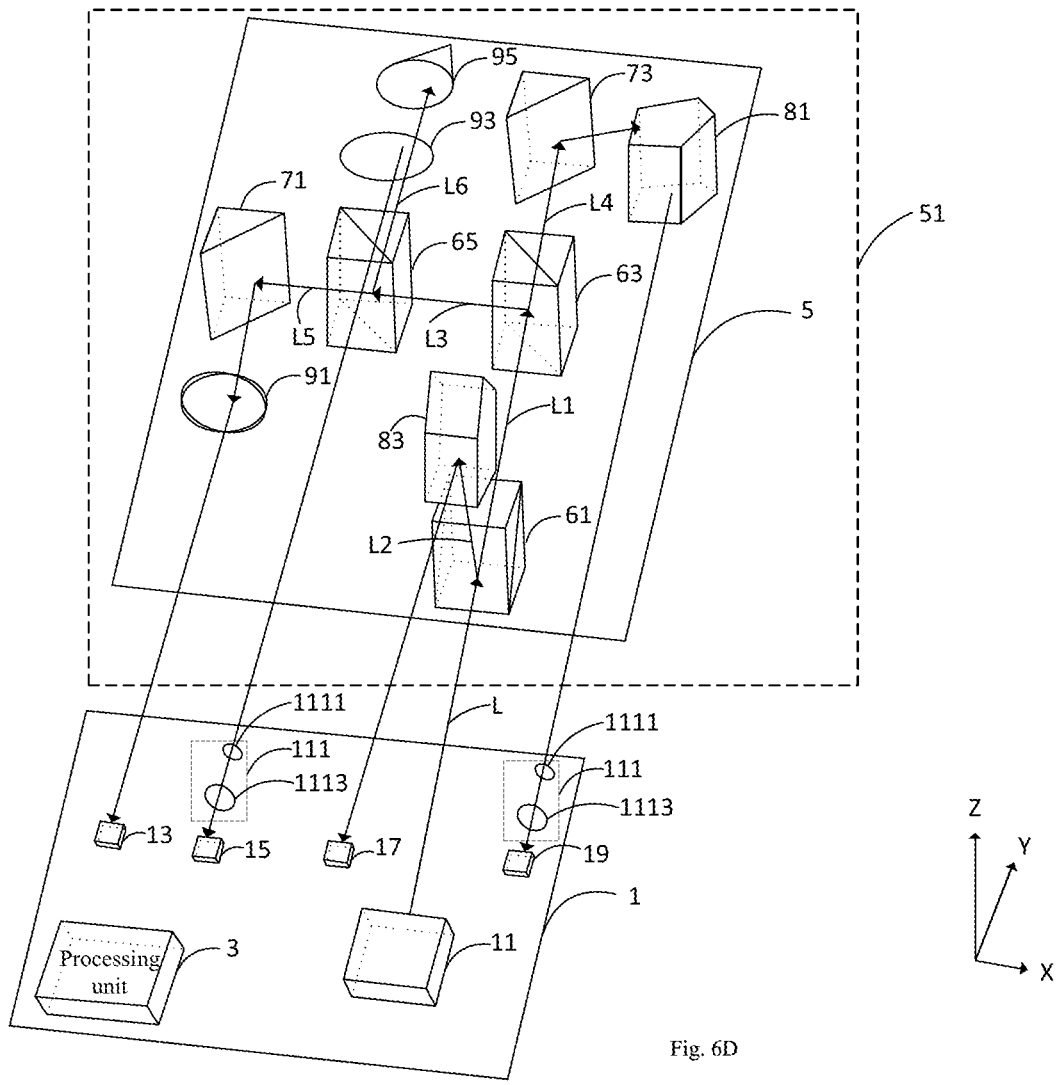

Moreover, as shown in FIG. 6D, according to the present embodiment, multiple biconvex lens set 111 can be disposed on the fixed platform 1. In other words, according to the present embodiment, one or more biconvex lens set 111 is disposed on the fixed platform 1.

By using the present embodiment, the light incident to the optoelectronic sensing modules can be further expanded for increasing shifts of the light and thus improving the accuracy of the system in measurement.

Figure 7:
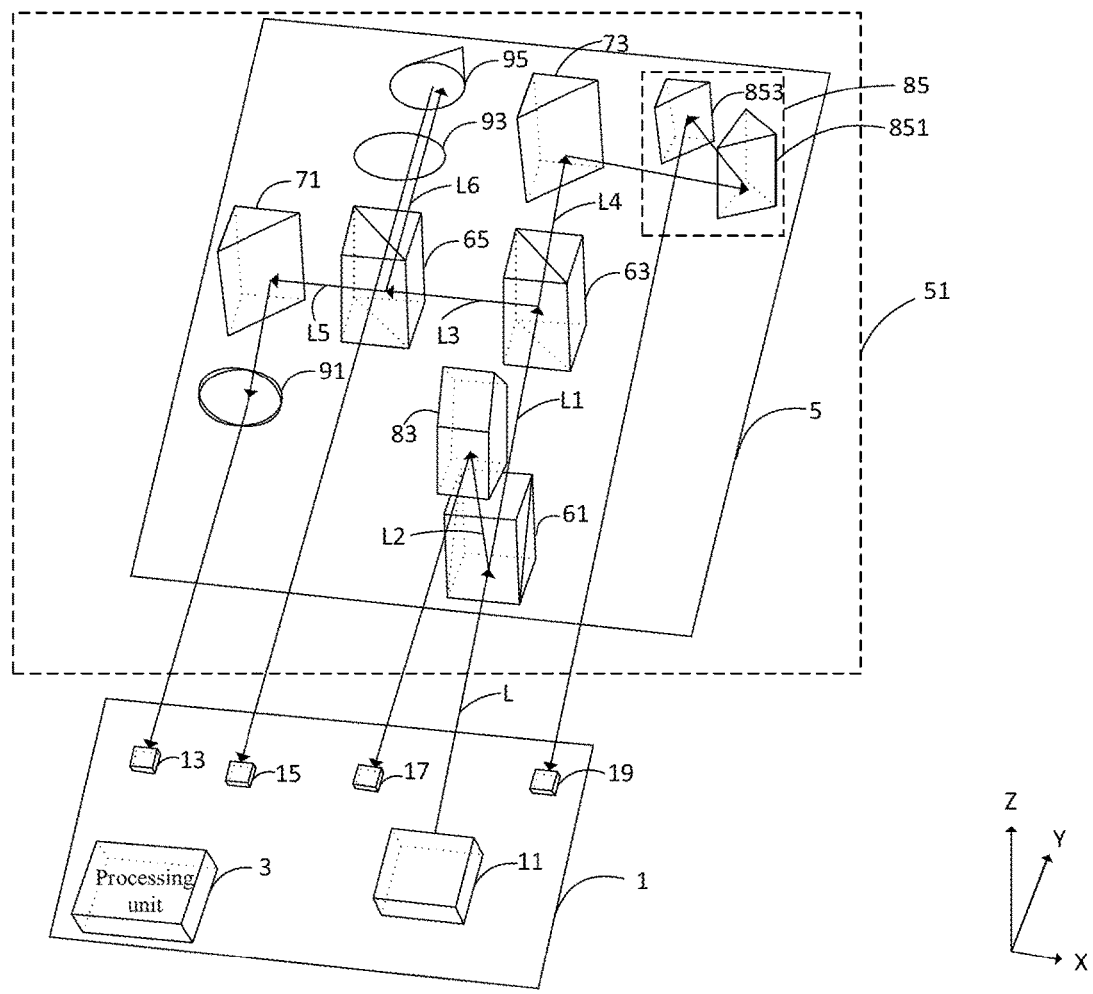
FIG. 7 shows a schematic diagram of the light path in the method and apparatus for measuring errors of a movable platform in multiple degrees of freedom according to the third embodiment of the present invention.

In the following, the method for measuring errors of a movable platform in multiple degrees of freedom according to the third embodiment of the present invention will be described. Please refer to FIG. 7, which shows a schematic diagram of the light path in the method and apparatus for measuring errors of a movable platform in multiple degrees of freedom according to the third embodiment of the present invention. As shown in the figure, the difference between the present embodiment and the first one is that, according to the present embodiment, the first vertical reflecting lens 81 is replaced by a vertical reflecting lens set 85 (a first vertical reflecting lens set). The vertical reflecting lens set 85 includes a third reflecting lens 851 and a fourth reflecting lens 853, which enable the light incident to the vertical reflecting lens set 85 to reflect two or more times in the vertical reflecting lens set 85 before emergence. Namely, according to the present embodiment, a combination of reflecting lenses is adopted to achieve identical effects of the first vertical reflecting lens 81. Nonetheless, the vertical reflecting lenses in the vertical reflecting lens set 85 can also include two or more reflecting lenses. That is to say, those vertical reflecting lens sets 85 formed by combining two or more reflecting lens and enable the light incident to the lens set to reflect two or more times and emerge belong to the vertical reflecting lens set 85 according to the third embodiment of the present invention.

According to an embodiment of the present invention, the second vertical reflecting lens 83 can also be replaced by the vertical reflecting lens set 85 (a second vertical reflecting lens set).

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for measuring errors of a movable platform in multiple degrees of freedom, comprising steps of:
   a light-source module emitting a beam of light to a lens module disposed on a movable platform;
   said light reflected to one or more optoelectronic sensing module via said lens module; and
   a processing unit calculating an alignment error or/and one or more straightness error or/and one or more angle error of said movable platform according to the signal generated by said optoelectronic sensing module upon receiving said light;
   when said one or more optoelectronic sensing module includes a third optoelectronic sensing module and a fourth optoelectronic sensing module, said processing unit calculating to give the X-axis angle error or/and the Y-axis angle error or/and the Z-axis angle error of said movable platform according to the signals generated by said third optoelectronic sensing module and said fourth optoelectronic sensing module upon receiving said light.

2. The method for measuring errors of a movable platform in multiple degrees of freedom of claim 1, and when said one or more optoelectronic sensing module includes a first optoelectronic sensing module, said processing unit calculating to give the Y-axis alignment error of said movable platform according to the centroid coordinates of a first light spot generated by said light on said first optoelectronic sensing module.

3. The method for measuring errors of a movable platform in multiple degrees of freedom of claim 1, and when said one or more optoelectronic sensing module includes a second optoelectronic sensing module, said processing unit calculating to give the X-axis straightness error or/and the Z-axis straightness error of said movable platform according to the centroid coordinates of a second light spot generated by said light on said second optoelectronic sensing module.

4. The method for measuring errors of a movable platform in multiple degrees of freedom of claim 1, wherein when said lens module includes a first vertical reflecting lens or a first vertical reflecting lens set, after said light is incident to said first vertical reflecting lens or said first vertical reflecting lens set, said light is reflected in said first vertical reflecting lens or said first vertical reflecting lens set for two or more times and emerges vertically to said fourth optoelectronic sensing module.

5. The method for measuring errors of a movable platform in multiple degrees of freedom of claim 1, wherein when said lens module includes a second vertical reflecting lens or a second vertical reflecting lens set, after said light is incident to said second vertical reflecting lens or said second vertical reflecting lens set, said light is reflected in said second vertical reflecting lens or said second vertical reflecting lens set for two or more times and emerges vertically to said third optoelectronic sensing module.

6. A method for measuring errors of a movable platform in multiple degrees of freedom, comprising steps of:
   a light-source module emitting a beam of light to a first spectroscope disposed on a movable platform;
   said first spectroscope forming a first split beam and a second split beam, said first split beam incident to a second spectroscope disposed on said movable platform;
   said second spectroscope forming a third split beam and a fourth split beam, said third split beam incident to a polarizing spectroscope disposed on said movable platform;
   said polarizing spectroscope forming a fifth split beam and a sixth split beam, said fifth split beam incident to a reflecting lens disposed on said movable platform;
   said first reflecting lens reflecting said fifth split beam to a first lens disposed on said movable platform, and said fifth split beam passing through said first lens and projected to a first optoelectronic sensing module; and
   a processing unit calculating to give the Y-axis alignment error of said movable platform according to the centroid coordinates of a first light spot generated by projecting said fifth split beam on said first optoelectronic sensing module.

7. The method for measuring errors of a movable platform in multiple degrees of freedom of claim 6, wherein said sixth split beam passes through a quarter wavelength plate disposed on said movable platform and is incident to a corner cube prism disposed on said movable platform; said corner cube prism reflects said sixth split beam to be incident to a second optoelectronic sensing module; and said processing unit calculates to give the X-axis straightness error or/and the Z-axis straightness error of said movable platform according to the centroid coordinates of a second light spot generated by projecting said sixth split beam on said second optoelectronic sensing module.

8. The method for measuring errors of a movable platform in multiple degrees of freedom of claim 6, wherein said fourth split beam is incident to a second reflecting lens disposed on said movable platform; after said second reflecting lens reflects said fourth split beam to a first vertical reflecting lens or a first vertical reflecting lens set, said fourth split beam is reflected in said first vertical reflecting lens or said first vertical reflecting lens set for two or more times and emerges vertically to a fourth optoelectronic sensing module; after said second split beam is incident to a second vertical reflecting lens or a second vertical reflecting lens set disposed on said movable platform, said second split beam is reflected in said second vertical reflecting lens or said second vertical reflecting lens set for two or more times and emerges vertically to a third optoelectronic sensing module; and said processing unit calculates to give the X-axis angle error or/and Y-axis angle error or/and Z-axis angle error of said movable platform according to the signal generated by said fourth optoelectronic sensing module upon receiving said fourth split beam and the signal generated by said third optoelectronic sensing module upon receiving said second split beam.

9. The method for measuring errors of a movable platform in multiple degrees of freedom of claim 7, and further comprising one or more biconvex lens set, said second split beam projecting to said third optoelectronic sensing module after passing through said one or more biconvex lens set or/and said fourth split beam projecting to said fourth optoelectronic sensing module after passing through said one or more biconvex lens set or/and said sixth split beam projecting to said second optoelectronic sensing module after passing through said one or more biconvex lens set.

10. The method for measuring errors of a movable platform in multiple degrees of freedom of claim 8, and further comprising one or more biconvex lens set, said second split beam projecting to said third optoelectronic sensing module after passing through said one or more biconvex lens set or/and said fourth split beam projecting to said fourth optoelectronic sensing module after passing through said one or more biconvex lens set or/and said sixth split beam projecting to said second optoelectronic sensing module after passing through said one or more biconvex lens set.

11. A method for measuring errors of a movable platform in multiple degrees of freedom, comprising steps of:
  a light-source module emitting a beam of light to a first spectroscope disposed on a movable platform;
  said first spectroscope forming a first split beam and a second split beam, said first split beam incident to a second spectroscope disposed on said movable platform;
  said second spectroscope forming a third split beam and a fourth split beam, said third split beam incident to a polarizing spectroscope disposed on said movable platform;
  said polarizing spectroscope forming a fifth split beam and a sixth split beam, said sixth split beam passing through a quarter wavelength plate disposed on said movable platform and incident to a corner cube prism disposed on said movable platform, and said corner cube prism reflecting said sixth split beam to enable said sixth split beam incident to a second optoelectronic sensing module; and
  a processing unit calculating to give the X-axis straightness error or/and the Z-axis straightness error of said movable platform according to the centroid coordinates of a second light spot generated by projecting said sixth split beam on said second optoelectronic sensing module.

12. The method for measuring errors of a movable platform in multiple degrees of freedom of claim 11, wherein said fifth split beam is incident to a first reflecting lens disposed on said movable platform; said first reflecting lens reflects said fifth split beam to a first lens disposed on said movable platform; said fifth split beam passes through said first lens and is projected to a first optoelectronic sensing module; and said processing unit calculates to give the Y-axis alignment error of said movable platform according to the centroid coordinates of a first light spot generated by projecting said fifth split beam on said first optoelectronic sensing module.

13. The method for measuring errors of a movable platform in multiple degrees of freedom of claim 11, wherein said fourth split beam is incident to a second reflecting lens disposed on said movable platform; after said second reflecting lens reflects said fourth split beam to a first vertical reflecting lens or a first vertical reflecting lens set, said fourth split beam is reflected in said first vertical reflecting lens or said first vertical reflecting lens set for two or more times and emerges vertically to a fourth optoelectronic sensing module; after said second split beam is incident to a second vertical reflecting lens or a second vertical reflecting lens set disposed on said movable platform, said second split beam is reflected in said second vertical reflecting lens or said second vertical reflecting lens set for two or more times and emerges vertically to a third optoelectronic sensing module; and said processing unit calculates to give the X-axis angle error or/and Y-axis angle error or/and Z-axis angle error of said movable platform according to the signal generated by said fourth optoelectronic sensing module upon receiving said fourth split beam and the signal generated by said third optoelectronic sensing module upon receiving said second split beam.

14. The method for measuring errors of a movable platform in multiple degrees of freedom of claim 11, and further comprising one or more biconvex lens set, said second split beam projecting to said third optoelectronic sensing module after passing through said one or more biconvex lens set or/and said fourth split beam projecting to said fourth optoelectronic sensing module after passing through said one or more biconvex lens set or/and said sixth split beam projecting to said second optoelectronic sensing module after passing through said one or more biconvex lens set.

15. The method for measuring errors of a movable platform in multiple degrees of freedom of claim 13, and further comprising one or more biconvex lens set, said second split beam projecting to said third optoelectronic sensing module after passing through said one or more biconvex lens set or/and said fourth split beam projecting to said fourth optoelectronic sensing module after passing through said one or more biconvex lens set or/and said sixth split beam projecting to said second optoelectronic sensing module after passing through said one or more biconvex lens set.

16. A method for measuring errors of a movable platform in multiple degrees of freedom, comprising steps of:
  a light-source module emitting a beam of light to a first spectroscope disposed on a movable platform;
  said first spectroscope forming a first split beam and a second split beam, said first split beam incident to a second spectroscope disposed on said movable platform;
  said second spectroscope forming a third split beam and a fourth split beam, said fourth split beam incident to a second reflecting lens disposed on said movable platform, said second reflecting lens reflecting said fourth split beam to a first vertical reflecting lens or a first vertical reflecting lens set disposed on said movable platform, said fourth split beam reflecting in said first vertical reflecting lens or said first vertical reflecting lens set for two or more times, and said fourth split beam emerging vertically to a fourth optoelectronic sensing module;

said second split beam incident to a second vertical reflecting lens or a second vertical reflecting lens set disposed on said movable platform, said second split beam reflecting in said second vertical reflecting lens or said second vertical reflecting lens set for two or more times, and said second split beam emerging vertically to a third optoelectronic sensing module; and a processing unit calculating to give the X-axis angle error or/and the Y-axis angle error or/and the Z-axis angle error of said movable platform according to the signal generated by said fourth optoelectronic sensing module upon receiving said fourth split beam and the signal generated by said third optoelectronic sensing module upon receiving said second split beam.

17. The method for measuring errors of a movable platform in multiple degrees of freedom of claim 16, wherein said polarizing spectroscope forms a fifth split beam and a sixth split beam; after said sixth split beam passes through a quarter wavelength plate disposed on said movable platform, said sixth split beam is incident to a corner cube prism disposed on said movable platform; said corner cube prism reflects said sixth split beam to enable said sixth split beam incident to a second optoelectronic sensing module; and said processing unit calculates to give the X-axis straightness error or/and the Z-axis straightness error of said movable platform according to the centroid coordinates of a second light spot formed by projecting said sixth split beam on said second optoelectronic sensing module.

18. The method for measuring errors of a movable platform in multiple degrees of freedom of claim 16, and further comprising one or more biconvex lens set, said second split beam projecting to said third optoelectronic sensing module after passing through said one or more biconvex lens set or/and said fourth split beam projecting to said fourth optoelectronic sensing module after passing through said one or more biconvex lens set or/and said sixth split beam projecting to said second optoelectronic sensing module after passing through said one or more biconvex lens set.

19. The method for measuring errors of a movable platform in multiple degrees of freedom of claim 17, and further comprising one or more biconvex lens set, said second split beam projecting to said third optoelectronic sensing module after passing through said one or more biconvex lens set or/and said fourth split beam projecting to said fourth optoelectronic sensing module after passing through said one or more biconvex lens set or/and said sixth split beam projecting to said second optoelectronic sensing module after passing through said one or more biconvex lens set.

20. The method for measuring errors of a movable platform in multiple degrees of freedom of claim 16, wherein said polarizing spectroscope forms a fifth split beam and a sixth split beam; said fifth split beam is incident to a first reflecting lens disposed on said movable platform; said first reflecting lens reflects said fifth split beam to a first lens disposed on said movable platform; said fifth split beam passes through said first lens and projects to a first optoelectronic sensing module; and said processing unit calculates to give the Y-axis alignment error of said movable platform according to the centroid coordinates of a first light spot formed by projecting said fifth split beam on said first optoelectronic sensing module.

21. An apparatus for measuring errors of a movable platform in multiple degrees of freedom, comprising:
a fixed platform, including a light-source module and one or more optoelectronic sensing module;
a movable platform, including:
a first spectroscope, disposed on said movable platform and corresponding to said light-source module, said light-source module emitting a beam of light to said first spectroscope, and said first spectroscope forming a first split beam and a second split beam;
a second spectroscope, disposed on one side of said first spectroscope, said first split beam incident to said second spectroscope, and said second spectroscope forming a third split beam and a fourth split beam;
a polarizing spectroscope, disposed on one side of said second spectroscope, said third split beam incident to said polarizing spectroscope, and said polarizing spectroscope forming a fifth split beam and a sixth split beam;
a first reflecting lens, disposed on one side of said polarizing spectroscope, and reflecting said fifth split beam;
a first lens, disposed on one side of said first reflecting lens, and said fifth split beam passing through said first lens; and
a processing unit, connected electrically with said one or more optoelectronic sensing module;
where after said fifth split beam passes through said first lens, said fifth split beam projects to a first optoelectronic sensing module in said one or more optoelectronic sensing module; and said processing unit calculates to give the Y-axis alignment error of said movable platform according to the centroid coordinates of a first light spot formed by projecting said fifth split beam on said first optoelectronic sensing module.

22. The apparatus for measuring errors of a movable platform in multiple degrees of freedom of claim 21, and further comprising:
a quarter wavelength plate, disposed on one side of said polarizing spectroscope, and said sixth split beam passing through said quarter wavelength plate; and
a corner cube prism, disposed on one side of said quarter wavelength plate, and said sixth split beam passing through said corner cube prism;
where after said corner cube prism reflects said sixth split beam to pass through said quarter wavelength plate and said polarizing spectroscope, said sixth split beam projects to a second optoelectronic sensing module of said one or more optoelectronic sensing module; and said processing unit calculates to give the X-axis straightness error or/and Z-axis straightness error of said movable platform according to the centroid coordinates of a second light spot formed by projecting said sixth split beam on said second optoelectronic sensing module.

23. The apparatus for measuring errors of a movable platform in multiple degrees of freedom of claim 21, and further comprising:
a second reflecting lens, disposed on one side of said second spectroscope, and reflecting said fourth split beam;
a first vertical reflecting lens or a first vertical reflecting lens set, disposed on one side of said second reflecting lens, and said fourth split beam reflecting in said first vertical reflecting lens or said first vertical reflecting lens set for two or more times before emerging vertically; and a second vertical reflecting lens or a second vertical reflecting lens set, disposed on one side of said first spectroscope, and said second split beam reflecting in said second vertical reflecting lens or said second vertical reflecting lens set for two or more times before emerging vertically;

where said second vertical reflecting lens or said second vertical reflecting lens set emits said second split beam to a third optoelectronic sensing module of said one or more optoelectronic sensing module; said first vertical reflecting lens or said first vertical reflecting lens set emits said fourth split beam to a fourth optoelectronic sensing module of said one or more optoelectronic sensing module; and said processing unit calculates to give the X-axis angle error or/and Y-axis angle error or/and Z-axis angle error of said movable platform according to the signal generated by said third optoelectronic sensing module upon receiving said second split beam and the signal generated by said fourth optoelectronic sensing module upon receiving said fourth split beam.

24. An apparatus for measuring errors of a movable platform in multiple degrees of freedom, comprising:
a fixed platform, including a light-source module and one or more optoelectronic sensing module;
a movable platform, including:
a first spectroscope, disposed on said movable platform and corresponding to said light-source module, said light-source module emitting a beam of light to said first spectroscope, and said first spectroscope forming a first split beam and a second split beam;
a second spectroscope, disposed on one side of said first spectroscope, said first split beam incident to said second spectroscope, and said second spectroscope forming a third split beam and a fourth split beam;
a polarizing spectroscope, disposed on one side of said second spectroscope, said third split beam incident to said polarizing spectroscope, and said polarizing spectroscope forming a fifth split beam and a sixth split beam;
a quarter wavelength plate, disposed on one side of said polarizing spectroscope, and said sixth split beam passing through said quarter wavelength plate; and
a corner cube prism, disposed on one side of said quarter wavelength plate, and said sixth split beam passing through said corner cube prism;
a processing unit, connected electrically with said one or more optoelectronic sensing module;
where after said corner cube prism reflects said sixth split beam to pass through said quarter wavelength plate and said polarizing spectroscope, said sixth split beam projects to a second optoelectronic sensing module of said one or more optoelectronic sensing module; and said processing unit calculates to give the X-axis straightness error or/and Z-axis straightness error of said movable platform according to the centroid coordinates of a second light spot formed by projecting said sixth split beam on said second optoelectronic sensing module.

25. The apparatus for measuring errors of a movable platform in multiple degrees of freedom of claim 24, and further comprising:
a first reflecting lens, disposed on one side of said polarizing spectroscope, and reflecting said fifth split beam; and a first lens, disposed on one side of said first reflecting lens, and said fifth split beam passing through said first lens;
where after said fifth split beam passes through said first lens, said fifth split beam projects to a first optoelectronic sensing module in said one or more optoelectronic sensing module; and said processing unit calculates to give the Y-axis alignment error of said movable platform according to the centroid coordinates of a first light spot formed by projecting said fifth split beam on said first optoelectronic sensing module.

26. The apparatus for measuring errors of a movable platform in multiple degrees of freedom of claim 24, and further comprising:
a second reflecting lens, disposed on one side of said second spectroscope, and reflecting said fourth split beam;
a first vertical reflecting lens or a first vertical reflecting lens set, disposed on one side of said second reflecting lens, and said fourth split beam reflecting in said first vertical reflecting lens or said first vertical reflecting lens set for two or more times before emerging vertically; and
a second vertical reflecting lens or a second vertical reflecting lens set, disposed on one side of said first spectroscope, and said second split beam reflecting in said second vertical reflecting lens or said second vertical reflecting lens set for two or more times before emerging vertically;
where said first vertical reflecting lens or said first vertical reflecting lens set emits said fourth split beam to a fourth optoelectronic sensing module of said one or more optoelectronic sensing module; said second vertical reflecting lens or said second vertical reflecting lens set emits said second split beam to a third optoelectronic sensing module of said one or more optoelectronic sensing module; and said processing unit calculates to give the X-axis angle error or/and Y-axis angle error or/and Z-axis angle error of said movable platform according to the signal generated by said third optoelectronic sensing module upon receiving said second split beam and the signal generated by said fourth optoelectronic sensing module upon receiving said fourth split beam.

27. An apparatus for measuring errors of a movable platform in multiple degrees of freedom, comprising:
a fixed platform, including a light-source module and one or more optoelectronic sensing module;
a movable platform, including:
a first spectroscope, disposed on said movable platform and corresponding to said light-source module, said light-source module emitting a beam of light to said first spectroscope, and said first spectroscope forming a first split beam and a second split beam;
a second spectroscope, disposed on one side of said first spectroscope, said first split beam incident to said second spectroscope, and said second spectroscope forming a third split beam and a fourth split beam;
a second reflecting lens, disposed on one side of said second spectroscope, and reflecting said fourth split beam;
a first vertical reflecting lens or a first vertical reflecting lens set, disposed on one side of said second reflecting lens, and said fourth split beam reflecting in said first vertical reflecting lens or said first vertical reflecting lens set for two or more times before emerging vertically; and a second vertical reflecting lens or a second vertical reflecting lens set, disposed on one side of said first spectroscope, and said second split beam reflecting in said second vertical reflecting lens or said second vertical reflecting lens set for two or more times before emerging vertically; and a processing unit, connected electrically with said one or more optoelectronic sensing module;

where said first vertical reflecting lens or said first vertical reflecting lens set emits said fourth split beam to a fourth optoelectronic sensing module of said one or more optoelectronic sensing module; said second vertical reflecting lens or said second vertical reflecting lens set emits said second split beam to a third optoelectronic sensing module of said one or more optoelectronic sensing module; and said processing unit calculates to give the X-axis angle error or/and Y-axis angle error or/and Z-axis angle error of said movable platform according to the signal generated by said third optoelectronic sensing module upon receiving said second split beam and the signal generated by said fourth optoelectronic sensing module upon receiving said fourth split beam.

28. The apparatus for measuring errors of a movable platform in multiple degrees of freedom of claim 27, and further comprising:

a polarizing spectroscope, disposed on one side of said second spectroscope, said third split beam incident to said polarizing spectroscope, and said polarizing spectroscope forming a fifth split beam and a sixth split beam;

a quarter wavelength plate, disposed on one side of said polarizing spectroscope, and said sixth split beam passing through said quarter wavelength plate;

a corner cube prism, disposed on one side of said quarter wavelength plate, and said sixth split beam passing through said corner cube prism; and where after said corner cube prism reflects said sixth split beam to pass through said quarter wavelength plate and said polarizing spectroscope, said sixth split beam projects to a second optoelectronic sensing module of said one or more optoelectronic sensing module; and said processing unit calculates to give the X-axis straightness error or/and Z-axis straightness error of said movable platform according to the centroid coordinates of a second light spot formed by projecting said sixth split beam on said second optoelectronic sensing module.

29. The apparatus for measuring errors of a movable platform in multiple degrees of freedom of claim 27, and further comprising:

a polarizing spectroscope, disposed on one side of said second spectroscope, said third split beam incident to said polarizing spectroscope, and said polarizing spectroscope forming a fifth split beam and a sixth split beam;

a first reflecting lens, disposed on one side of said polarizing spectroscope, and reflecting said fifth split beam; and a first lens, disposed on one side of said first reflecting lens, and said fifth split beam passing through said first lens;

where after said fifth split beam passes through said first lens, said fifth split beam projects to a first optoelectronic sensing module in said one or more optoelectronic sensing module; and said processing unit calculates to give the Y-axis alignment error of said movable platform according to the centroid coordinates of a first light spot formed by projecting said fifth split beam on said first optoelectronic sensing module.

* * * * *